United States Patent
Nakama et al.

(10) Patent No.: US 10,209,455 B2
(45) Date of Patent: Feb. 19, 2019

(54) OPTICAL-FIBER-ATTACHED FERRULE AND METHOD OF MANUFACTURING THE SAME

(71) Applicant: FUJIKURA LTD., Tokyo (JP)

(72) Inventors: Akihiro Nakama, Chiba (JP); Shigeo Takahashi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/569,660

(22) PCT Filed: Dec. 5, 2016

(86) PCT No.: PCT/JP2016/086030
§ 371 (c)(1),
(2) Date: Oct. 26, 2017

(87) PCT Pub. No.: WO2017/094912
PCT Pub. Date: Jun. 8, 2017

(65) Prior Publication Data
US 2018/0120512 A1    May 3, 2018

(30) Foreign Application Priority Data
Dec. 4, 2015  (JP) .................................. 2015-237215

(51) Int. Cl.
G02B 6/36     (2006.01)
G02B 6/38     (2006.01)
G02B 6/42     (2006.01)

(52) U.S. Cl.
CPC ............... *G02B 6/382* (2013.01); *G02B 6/36* (2013.01); *G02B 6/3821* (2013.01);
(Continued)

(58) Field of Classification Search
None
See application file for complete search history.

(56) References Cited

U.S. PATENT DOCUMENTS 6,257,772 B1 * 7/2001 Nakanishi ............ G02B 6/4212
257/432
9,063,304 B2   6/2015 Ohta et al.
(Continued)

FOREIGN PATENT DOCUMENTS

JP  2003-248143 A   9/2003
JP  2005-099477 A   4/2005
(Continued)

OTHER PUBLICATIONS

Office Action in corresponding Japanese Patent Application No. 2015-237215 dated Sep. 5, 2017 (3 pages).
(Continued)

*Primary Examiner* — Chad H Smith
(74) *Attorney, Agent, or Firm* — Osha Liang LLP

(57) ABSTRACT

An optical-fiber-attached ferrule includes: an optical fiber hole into which an optical fiber is inserted; and a filling section filled with a liquid refractive index-matching material. The filling section internally includes an opening surface of the optical fiber hole and an opposed surface that is opposed to the opening surface, and the filling section is filled with the liquid refractive index-matching material while an end surface of the optical fiber inserted into the optical fiber hole abuts with the opposed surface

9 Claims, 7 Drawing Sheets

(FIRST EMBODIMENT)

(52) U.S. Cl.
CPC ......... *G02B 6/3853* (2013.01); *G02B 6/3861* (2013.01); *G02B 6/3867* (2013.01); *G02B 6/3869* (2013.01); *G02B 6/3885* (2013.01); *G02B 6/4212* (2013.01); *G02B 6/4214* (2013.01)

(56) References Cited

U.S. PATENT DOCUMENTS

| | | |
|---|---|---|
| 2003/0142946 A1 | 7/2003 | Saito et al. |
| 2004/0070187 A1* | 4/2004 | Chen .................... A46B 9/028 280/742 |
| 2006/0245694 A1* | 11/2006 | Chen ....................... G02B 6/32 385/71 |
| 2009/0087150 A1 | 4/2009 | Benjamin et al. |
| 2011/0317959 A1 | 12/2011 | Ohta et al. |
| 2012/0093462 A1* | 4/2012 | Childers ............. G02B 6/3831 385/33 |
| 2013/0308910 A1 | 11/2013 | Nishimura et al. |
| 2015/0023636 A1 | 1/2015 | Moriyama et al. |

FOREIGN PATENT DOCUMENTS

| | | |
|---|---|---|
| JP | 2007-178786 A | 7/2007 |
| JP | 2012-13805 A | 1/2012 |
| JP | 2013-213949 A | 10/2013 |
| JP | 5564344 B2 | 7/2014 |
| JP | 2015-22130 A | 2/2015 |

OTHER PUBLICATIONS

Office Action in counterpart Chinese Patent Application 201680025902.8 dated Oct. 16, 2018 (7 pages).

* cited by examiner

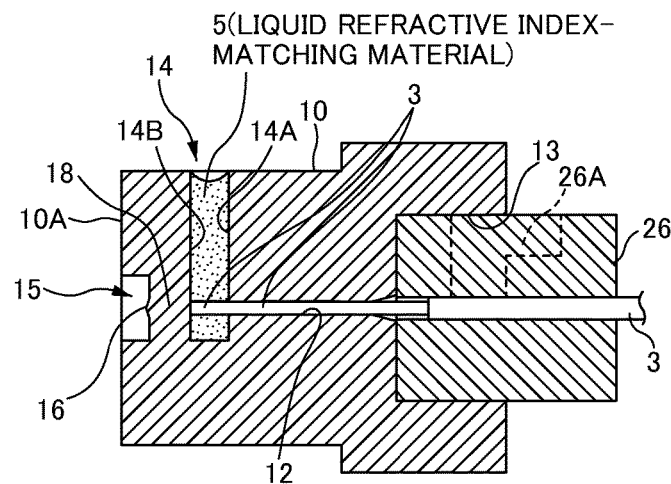
FIG. 3A(FIRST EMBODIMENT)
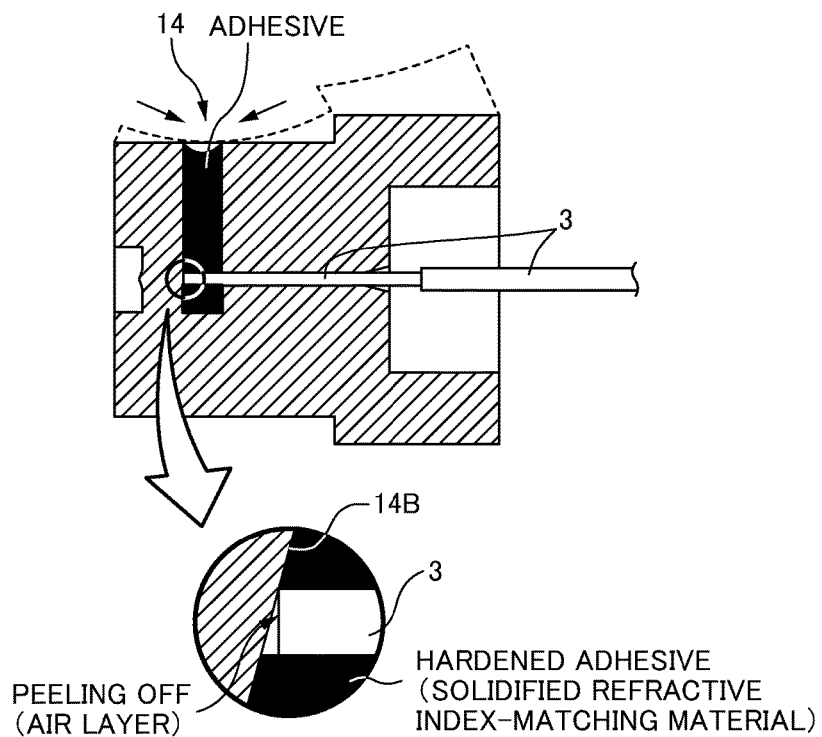
FIG. 3B(COMPARATIVE EXAMPLE)

OPTICAL-FIBER-ATTACHED FERRULE AND METHOD OF MANUFACTURING THE SAME

TECHNICAL FIELD

This invention relates to an optical-fiber-attached ferrule and a method of manufacturing the same.

BACKGROUND ART

As a ferrule to hold end portions of optical fibers, there has been known the following ferrule. The ferrule includes an adhesive-filling section having an opening from which an adhesive is filled. The adhesive is filled in the adhesive-filling section to fix the optical fibers. Patent Literature 1 discloses that an adhesive is filled and hardened in an adhesive-filling section while end surfaces of optical fibers are caused to abut onto an inner wall of the adhesive-filling section of a ferrule.

Patent Literature

Patent Literature 1: Japanese Patent No. 5564344

After an adhesive-filling section is filled with an adhesive and the adhesive is hardened, in the case where a ferrule deforms by an environmental change due to, for example, high temperature and high humidity, end surfaces of fibers peel off from an abutting surface of an inner wall of the adhesive-filling section, possibly resulting in increase in transmission loss.

SUMMARY

One or more embodiments of the present invention provide an optical-fiber-attached ferrule that can reduce transmission loss.

According to one or more embodiments of the present invention, an optical-fiber-attached ferrule includes: an optical fiber hole into which an optical fiber is inserted; and a filling section filled with a liquid refractive index-matching material, the filling section internally including an opening surface of the optical fiber hole and an opposed surface opposed to the opening surface, wherein the filling section is filled with the liquid refractive index-matching material with an end surface of the optical fiber inserted into the optical fiber hole being caused to abut onto the opposed surface.

Other features of the present invention will be made clear by the Description and Drawings described below.

According to one or more embodiments of the present invention, supposing that a ferrule deforms due to an environmental change, transmission loss can be reduced.

BRIEF DESCRIPTION OF DRAWINGS

FIG. 3A is a cross-sectional view of the optical-fiber-attached ferrule 1 according to the first example of one or more embodiments. FIG. 3B is a cross-sectional view of a comparative example.

DETAILED DESCRIPTION

Figure 1A:
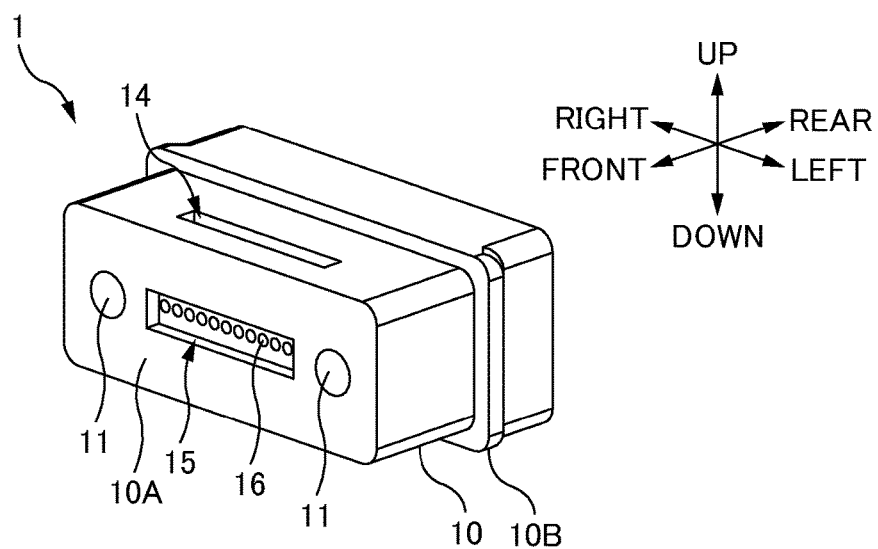
FIG. 1A and FIG. 1B are overall perspective views of a ferrule 1 according to a first example of one or more embodiments.

At least the following matters will be made clear from the descriptions below.

According to one or more embodiments, an optical-fiber-attached ferrule includes an optical fiber hole into which an optical fiber is inserted and a filling section filled with a liquid refractive index-matching material. The filling section internally includes an opening surface of the optical fiber hole and an opposed surface opposed to the opening surface. The filling section is filled with the liquid refractive index-matching material with an end surface of the optical fiber inserted into the optical fiber hole being caused to abut onto the opposed surface. With this optical-fiber-attached ferrule, deformation of the ferrule can be reduced, and supposing that the ferrule deforms, the liquid refractive index-matching material enters between the optical fiber end surface and the opposed surface. Accordingly, transmission loss can be reduced.

In one or more embodiments, the liquid refractive index-matching material has water repellency. This reduces deterioration of the liquid refractive index-matching material, allowing maintaining a physical property of the liquid refractive index-matching material.

In one or more embodiments, the liquid refractive index-matching material preferably does not overflow from the filling section when an opening of the filling section is provided downward. Accordingly, the filling section can hold the liquid refractive index-matching material.

In one or more embodiments, the liquid refractive index-matching material preferably has a viscosity in a range of 100 to 100000 mPa·s. The viscosity lower than this range dilutes the liquid refractive index-matching material due to condensed water content, possibly causing the liquid refractive index-matching material to flow out from the filling section. The viscosity higher than this range makes it difficult to fill the filling section with the liquid refractive index-matching material.

In one or more embodiments, the optical fiber is fixed with a boot into which the optical fiber is inserted. The boot is fixed with a boot hole disposed to the ferrule. This allows the optical fiber to be fixed to the ferrule.

In one or more embodiments, the optical fiber hole is fixed with the optical fiber. This allows the optical fiber to be fixed to the ferrule.

In one or more embodiments, the optical-fiber-attached ferrule includes a recess site and a lens section. The recess site is recessed with respect to an end surface of the ferrule. The lens section is foisted to the recess site. The lens section is disposed corresponding to the optical fiber hole. This eliminates a physical contact between the mutual optical fiber end surfaces, ensuring enhancing durability.

In one or more embodiments, the filling section has a ventilation hole foisted in a bottom of the filling section. Accordingly, an air bubble is less likely to be foisted on the bottom of the filling section, making the work for filling of the liquid refractive index-matching material easy.

In one or more embodiments, the optical-fiber-attached ferrule includes a lid to block the opening of the filling section. This allows the liquid refractive index-matching material to be sealed in the filling section.

According to one or more embodiments, a method of manufacturing the optical-fiber-attached ferrule includes: (1) preparing a ferrule that includes an optical fiber hole into which an optical fiber is inserted, and a filling section filled with a liquid refractive index-matching material, the filling section internally including an opening surface of the optical fiber hole and an opposed surface opposed to the opening surface; (2) causing an end surface of the optical fiber protruding from the opening surface to abut onto the opposed surface by inserting the optical fiber into the optical fiber hole; and (3) filling the filling section with the liquid refractive index-matching material with the end surface of the optical fiber being caused to abut onto the opposed surface. This ensures providing an optical-fiber-attached ferrule that can reduce the transmission loss.

<Configuration>

Figure 1B:
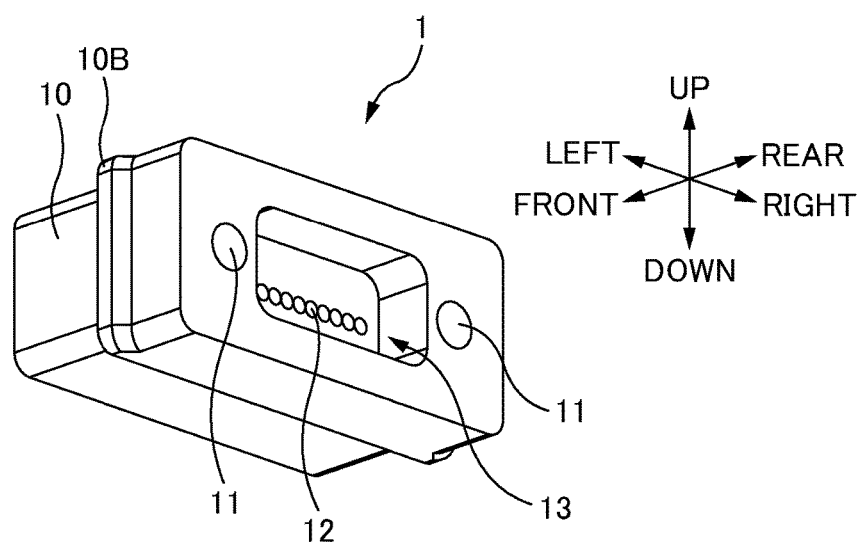
Figure 2:
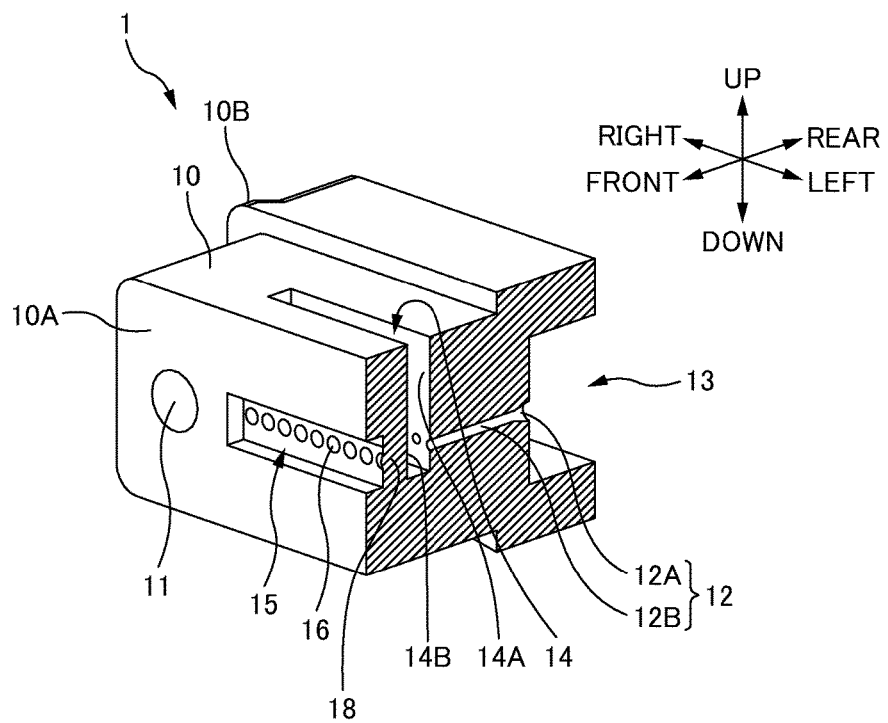
FIG. 2 is a cutaway perspective view of the ferrule 1 according to the first example of one or more embodiments.

FIG. 1A and FIG. 1B are overall perspective views of a ferrule 1 of a first example of one or more embodiments. FIG. 2 is a cutaway perspective view of the ferrule 1 of the first example of one or more embodiments.

The following description defines respective directions as illustrated in the drawings. That is, the direction of an optical fiber hole 12 is defined as a "front-rear direction". A coupling end surface 10A side of the ferrule 1 is defined as the "front" and the other side as the "rear." The thickness direction of the ferrule 1 is defined as an "up-down direction" and a side of an opening from which a refractive index-matching material is filled in a filling section 14 is defined as the "up" and the other side as the "down." A direction perpendicular to the front-rear direction and the up-down direction is defined as the "right-left direction." A width direction of the ferrule 1 is defined as the "right-left direction." A direction that two guide pin holes 11 are arranged is defined as the "right-left direction." A direction that the plurality of optical fiber holes 12 are arranged is defined as the "right-left direction." That is, a direction that a plurality of optical fibers 3 constituting an optical fiber ribbon (see reference numeral 4 in FIG. 6) mounted to the ferrule 1 are arranged is defined as the "right-left direction." In this right-left direction, the right side when the front is viewed from the rear is defined as the "right" and the other side as the "left."

First, the following describes differences between the ferrule 1 of the first example of one or more embodiments and an ordinary MT ferrule (an optical connector specified by JIS C5981).

In the ordinary MT ferrule, optical fiber end surfaces are exposed from a ferrule end surface. The ferrule end surfaces are caused to abut onto one another to physically couple the optical fiber end surfaces, thus optically coupling the mutual optical fibers.

In contrast to this, the optical fiber end surfaces are not exposed from the ferrule end surface 10A of the ferrule 1 of the first example of one or more embodiments. With the ferrule 1 of the first example of one or more embodiments, lens sections 16 are disposed in a recess site 15 of the ferrule end surface 10A, and an optical signal is input to/output from the lens sections 16. That is, the ferrule 1 has no physical contact between the optical fiber end surfaces. This features high durability, not causing deterioration even when the attachment and removal are repeatedly performed.

The ferrule 1 is a member to hold the end portions of the optical fibers 3 (see FIG. 3A) to transmit the optical signals. The end surface 10A (the ferrule end surface 10A) on the front side of a body portion 10 of the ferrule 1 is a coupling end surface coupled to a ferrule on the other side. A flange part 10B, which protrudes outside from the outer peripheral surface of the body portion 10, is formed on the rear side of the body portion 10. The body portion 10 including the ferrule end surface 10A and the flange part 10B are integrally molded with a resin (for example, a transparent resin) that can transmit the optical signal. The end port ions of the plurality of optical fibers 3 are held in the inside of this body portion 10. The dimension of the ferrule 1 in the front-rear direction is about 3.5 mm to 5.0 mm, which is shorter than the ordinary MT ferrule (about 8 mm).

The body portion 10 includes the guide pin holes 11, the optical fiber holes 12, a boot hole 13, the filling section 14, the recess site 15, the lens sections 16, and a light transmitting part 18.

The guide pin hole 11 is a hole through which a guide pin (see reference numeral 22 in FIG. 6) is inserted. Inserting the guide pins into the guide pin holes 11 matches the positions of the mutual ferrules 1. The guide pin holes 11 penetrate the body portion 10 in the front-rear direction. On the ferrule end surface 10A, the two guide pin holes 11 are open. The two guide pin holes 11 are formed spaced in the right-left direction so as to sandwich the plurality of optical fiber holes 12 laterally. The boot hole 13, the recess site 15, the lens sections 16, and the light transmitting part 18 are also disposed between the two guide pin holes 11 in addition to the optical fiber holes 12.

The optical fiber holes 12 are holes through which the optical fibers 3 are inserted. The optical fiber hole 12 is a hole to position the optical fiber 3. The optical fiber holes 12 penetrate between the boot hole 13 and the filling section 14. A bare fiber formed by removing a coat from an optical fiber is to be inserted into the optical fiber hole 12. The optical fiber holes 12 are parallel to the front-rear direction, and the plurality of optical fiber holes 12 are arranged side by side in the right-left direction. That is, the plurality of optical fiber holes 12 parallel to one another are arranged in the right-left direction. The optical fiber holes 12 each include a tapered part 12A and a fiber fixing part 12B.

The tapered part 12A is disposed at the rear end part of the optical fiber hole 12 and has a tapered shape expanding to the rear side. Disposing such tapered part 12A facilities inserting the optical fiber 3 into the optical fiber hole 12.

The fiber fixing part 12B is disposed on the front side with respect to the tapered part 12A and has a size (a diameter) approximately identical to the diameter of the optical fiber 3. This ensures positioning the optical fiber 3 inserted into the optical fiber hole 12.

The boot hole 13 is disposed on the end surface on the rear side of the ferrule 1. The boot hole 13 is a hole to house and fix a boot (see reference numeral 26 in FIG. 3A) mounted to the optical fibers 3.

The filling section 14 is a hollow portion from which the refractive index-matching material is filled. The filling section 14 forms the hollow that is long in the right-left direction (longer than a length of the plurality of optical fiber holes 12 and lens sections 16 which are arranged in the right-left direction). The filling section 14 opens to the top surface of the body portion 10 of the ferrule 1. The filling section 14 has the opening also elongated in the right-left direction (longer than a length of plurality of optical fiber holes 12 and lens sections 16 which are arranged in the right-left direction) on the top surface of the body portion 10 of the ferrule 1. According to the first example of one or more embodiments, the filling section 14 is to be filled with a liquid refractive index-matching material (described later), not an adhesive to be hardened.

The filling section 14 has an optical fiber hole opening surface 14A and an abutting surface 14B.

The optical fiber hole opening surface 14A is the inner wall on the rear side of the filling section 14. On the optical fiber hole opening surface 14A, the plurality of optical fiber holes 12 are open and arranged in the right-left direction. The abutting surface 14B is the inner wall on the front side of the filling section 14 and is an opposed surface opposed to the optical fiber hole opening surface 14A. The abutting surface 14B is opposed to the openings of the optical fiber holes 12 on the optical fiber hole opening surface 14A and is a surface onto which the end surfaces of the optical fibers 3 abut.

The recess site 15 is a site recessed to the ferrule end surface 10A. The recess site 15 is disposed between the two guide pin holes 11 on the ferrule end surface 10A. The recess site 15 is foamed into a rectangular shape elongated in the right-left direction so as to correspond to the plurality of optical fiber holes 12.

The lens sections 16 are disposed on the bottom surface (the surface to the rear side) of the recess site 15. The lens sections 16 are disposed corresponding to the plurality of respective optical fibers 3 (in other words, the plurality of optical fiber holes 12). The optical signal is input to and output from the optical fibers 3 via the lens sections 16. The lens section 16 is, for example, formed to function as a collimating lens. Inputting and outputting the optical signal whose diameter has been enlarged by the lens section 16 ensures reducing an influence from, for example, dust in an optical path, thereby ensuring reducing the transmission loss of the optical signal.

The light transmitting part 18 is a site (a site forming the optical path) that transmits the optical signals between the ferrule end surface 10A (in detail, the lens sections 16 in the recess site 15 of the ferrule end surface 10A) and the abutting surface 14B of the filling section 14. The body portion 10 is integrally molded with the resin that transmits the optical signals. Meanwhile, it is only necessary that at least the site (the light transmitting part 18) where the optical path is formed can transmit the optical signals, and a site other than this site may be made of another material (a material not transmitting the optical signals).

<Filler Filled in Filling Section 14>

FIG. 3B is a cross-sectional view of a comparative example. With the comparative example, the filling section 14 is an adhesive-filling section (an adhesive-filling window). To the filling section 14, a hardening adhesive (for example, an ultraviolet cure adhesive and a thermosetting adhesive) is filled. When the filling section 14 is open to the top surface of the ferrule 1, in the case where the hardened adhesive contracts, the ferrule 1 deforms such that the optical fiber opening surface 14A becomes close to the abutting surface 14B on the upper side (the opening side of the filling section 14) of the ferrule 1. However, since the ferrule 1 has a bottom wall, the ferrule 1 does not deform on the lower side of the ferrule 1. Consequently, as indicated by the dotted line in the drawing, the ferrule 1 deforms so as to warp. A cause of contraction of the adhesive includes, for example, a high temperature, high humidity environment and the hardening of the adhesive.

Further, as indicated by the dotted line in FIG. 3B, in the case where the ferrule 1 deforms so as to warp, the end surfaces of the optical fibers 3 peel off from the abutting surface 14B. Consequently, a peeling layer (an air layer) is formed between the end surfaces of the optical fibers 3 and the abutting surface 14B, possibly resulting in increase in transmission loss. The ordinary MT ferrule (the optical connector specified by JIS C5981) has the optical fiber end surfaces exposed from the ferrule end surface. In the MT ferrule, the optical fiber end surfaces are not caused to abut onto the inner wall (the abutting surface 14B) of the filling section 14. Therefore, provisionally, when the adhesive in the adhesive-filling section (the adhesive-filling window) contracts and causes the ferrule to deform so as to warp, peeling off between the optical fiber end surfaces and the abutting surface 14B does not occur. In view of this, the occurrence of peeling off of the optical fiber end surfaces is specific to the structure like the comparative example and the first example of one or more embodiments where the optical fiber end surfaces are caused to abut onto the inner wall of the filling section 14 (the abutting surface 14B).

FIG. 3A is a cross-sectional view of the optical-fiber-attached ferrule 1 of the first example of one or more embodiments.

According to the first example of one or more embodiments, a liquid refractive index-matching material 5 is filled in the filling section 14. The liquid refractive index-matching material 5 filled in the filling section 14 is not hardened but is held as a liquid. According to the first example of one or more embodiments, since the filler filled in the filling section 14 is a liquid, the ferrule 1 does not deform due to the contraction of the adhesive like the comparative example, ensuring reducing the increase in transmission loss. Supposing that the ferrule 1 deforms for any reason and the end surfaces of the optical fibers 3 come apart from the abutting surface 14B, because the liquid refractive index-matching material 5 enters a gap between the optical fibers 3 and the abutting surface 14B, this ensures reducing the increase in transmission loss. Thus, the first example of one or more embodiments can synergistically obtain the effect of reduction in transmission loss.

In addition to a physical property (such as viscosity) with which the liquid refractive index-matching material 5 can fill (be injected into) the filling section 14, the liquid refractive index-matching material 5 has a physical property such that, supposing that the ferrule 1 is placed upside down, the liquid refractive index-matching material 5 does not overflow from the filling section 14. Specifically, the viscosity of the liquid refractive index-matching material 5 is in a range of 100 to 100000 mPa·s and is in a range of 10000 to 100000 mPa·s because of the reason described as follows.

In a testing compliant to Telcordia GR-1435-CORE shown in the table below, adequate viscosity of the liquid refractive index-matching material 5 was 100 to 100000 mPa·s under conditions assuming an environment where a temperature and humidity were controlled like a data center (Controlled Environment). Under conditions assuming a usual environment (Uncontrolled Environment: conditions severer than Controlled Environment), the adequate viscosity of the liquid refractive index-matching material 5 was in a range of 10000 mPa·s to 100000 mPa·s. Under conditions assuming the usual environment (Uncontrolled Environment), with the viscosity of the liquid refractive index-matching material 5 being equal to or less than 10000 mPa·s, water content condensed at a high humidity mixes with the liquid refractive index-matching material 5 and the diluted liquid refractive index-matching material 5 possibly flows out from the filling section 14. In contrast to this, since the condensation does not occur under the conditions assuming the controlled environment (Controlled Environment), the liquid refractive index-matching material 5 flowing out from the filling section 14 does not occur with the viscosity of the liquid refractive index-matching material 5 being 10000 mPa·s or less. From such reason, the viscosity of the liquid refractive index-matching material 5 is 100 to 100000 mPa·s and is in a range of 10000 to 100000 mPa·s.

TABLE 1

| | Test Condition | |
| Test Item | Telcoadia 1435-Core Controlled Environment | Telcoadia 1435-Core Uncontrolled Environment |
| --- | --- | --- |
| Thermal Aging | 60° C., 4 days (Constant at 60° C.) | 85° C., 7 days (Constant at 85° C.) |
| Thermal Cycling | −40° C. to 75° C., 7 days (Cycling Test of −40° C. → 25° C. → 75° C.) | −10° C. to 60° C., 40 hours (Cycling Test of −10° C. → 25° C. → 60° C.) |
| Humidity Aging | 40° C., 90-95%, 4 days (Constant at 40° C., 95%) | 75° C., 95%, 7 days (Constant at 75° C., 95%) |
| Humidity/Condansation Cycling Test | — | −10° C. to 65° C., 90-100%, 7 days (Cycling Test of −10° C. → 25° C., 95% → 65° C., 95%) |

The liquid refractive index-matching material 5 is adjusted such that a difference in refractive index from the optical fiber 3 decreases due to reduction in Fresnel reflection. The difference in refractive index between the liquid refractive index-matching material 5 and the optical fiber 3 is within 0.1 and within 0.05.

As the liquid refractive index-matching material 5, here, water-repellent silicone oil is employed. With the use of not hydrophilic but water-repellent liquid refractive index-matching material 5, supposing that a water droplet and the like attaches to the optical-fiber-attached ferrule, the water content is prevented from being absorbed into the liquid refractive index-matching material 5 filled in the filling section 14. Thus, this avoids the deterioration of the liquid refractive index-matching material 5 due to, for example, the dilution, ensuring maintaining the physical property of the liquid refractive index-matching material 5. The liquid refractive index-matching material 5 is not limited to a silicone base but may be other high polymer oil.

Since the liquid refractive index-matching material 5 of the first example of one or more embodiments is not an adhesive, the liquid refractive index-matching material 5 cannot directly fix the end portions of the optical fibers 3 in the filling section 14 like the comparative example. In view of this, between the boot 26 and the optical fibers 3 is fixed with the adhesive and between the boot 26 and the ferrule 1 (the inner wall surface of the boot hole 13) is fixed with the adhesive. Thus, the optical fibers 3 are fixed to the ferrule 1. Between the optical fiber holes 12 and the optical fibers 3 may be fixed with the adhesive to fix the optical fibers 3 to the ferrule 1.

<Method of Manufacturing Fiber-Attached Ferrule 1>

Figure 4:
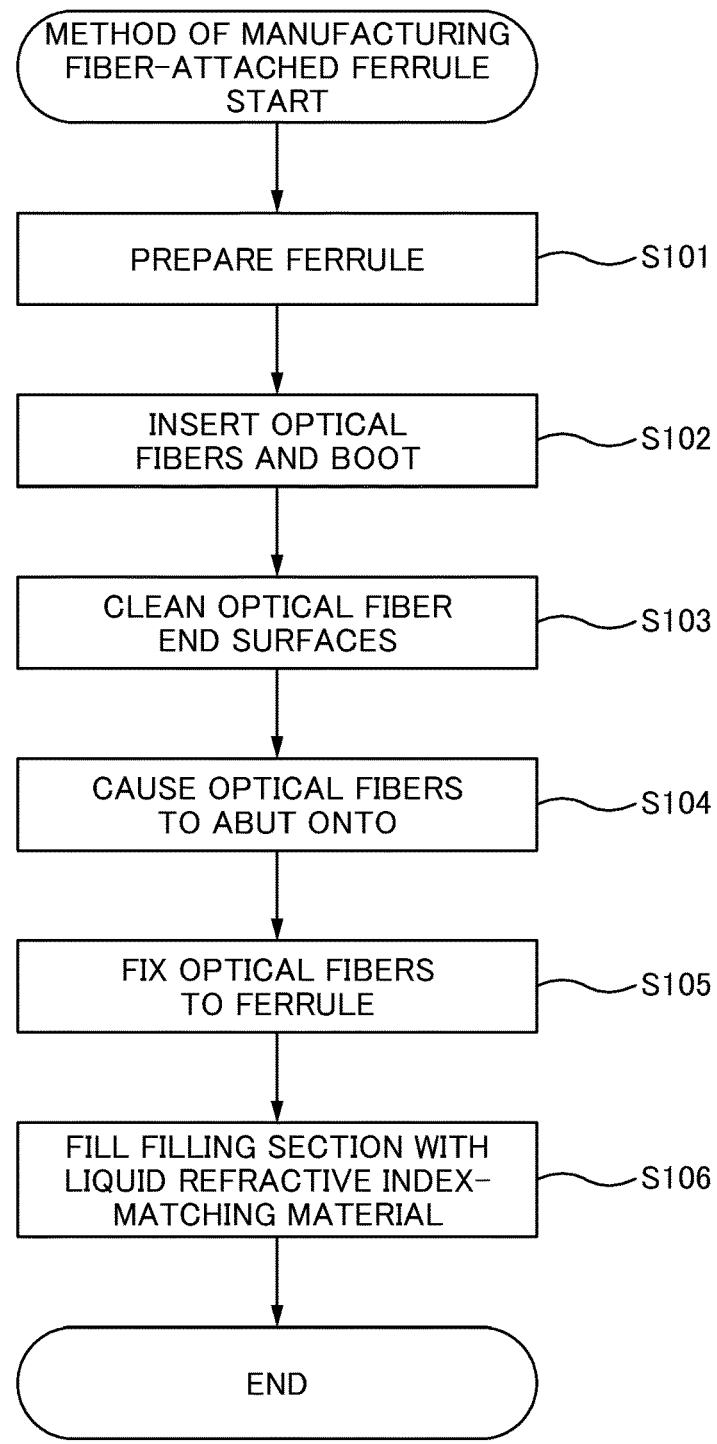
FIG. 4 is a flowchart of a manufacturing method (an assembly procedure) of the fiber-attached ferrule 1 according to one or more embodiments.

FIG. 4 is a flowchart of a manufacturing method (an assembly procedure) of the fiber-attached ferrule 1.

First, an operator prepares the ferrule 1 of the first example of one or more embodiments (S101). The operator inserts the respective optical fibers 3 of the optical fiber ribbon, which is preliminarily inserted into the boot 26, into the optical fiber holes 12 on the ferrule 1, and inserts the boot 26 into the boot hole 13 of the ferrule 1 (S102). Then, the optical fiber end surfaces are protruded from the optical fiber hole opening surface 14A. Note that, at this phase, the optical fiber end surfaces do not abut onto the abutting surface 14B of the filling section 14. This is because that, when the optical fibers 3 are passed through the optical fiber holes 12, dust and the like possibly attach to the optical fiber end surfaces.

Next, the operator cleans the optical fiber end surfaces protruded from the optical fiber hole opening surface 14A of the filling section 14 (S103). For example, the operator sprays air from the opening on the filling section 14 to blow off the dust on the optical fiber end surfaces. This allows removing the dust on the optical fiber end surfaces attached during the insertion to the optical fiber holes 12. To thus remove the dust on the optical fiber end surfaces, the liquid refractive index-matching material is filled in the filling section 14 after the insertion of the optical fibers 3, not preliminary filled before the insertion of the optical fibers 3.

After cleaning the optical fiber end surfaces, the operator slides the optical fibers 3 (the optical fiber ribbon) forward with respect to the boot 26 to cause the optical fiber end surfaces to abut onto the abutting surface 14B of the filling section 14 (S104). At this phase, an air layer is present between the optical fiber end surface and the abutting surface 14B.

Next, the operator fixes the optical fibers 3 to the ferrule 1 in the rear portion of the ferrule 1 (S105). Specifically, the operator fills an adhesive-filling section 26A (see the dotted line in FIG. 3A) disposed to the boot 26 with the thermosetting adhesive to permeate the adhesive up to a fiber insertion hole of the boot 26, thus permeating the adhesive between the boot 26 and the optical fibers 3. The adhesive-filling section 26A (see the dotted line in FIG. 3A) of the boot 26 is filled with the adhesive to permeate the adhesive between the boot 26 and the ferrule 1 (the inner wall surface of the boot hole 13). The adhesive-filling section 26A (see the dotted line in FIG. 3A) of the boot 26 may be filled with the adhesive to thus permeate the adhesive up to between the optical fiber holes 12 and the optical fibers 3. After the thermosetting adhesive is permeated into the respective portions, the operator heats and hardens the adhesive to thus bond and fix the optical fibers 3 to the ferrule 1. A method for applying the adhesive is not limited to the method of using the adhesive-filling section 26A.

Next, the operator fills the filling section 14 with the liquid refractive index-matching material 5 (S106). The filling of the liquid refractive index-matching material 5 between the optical fiber end surfaces and the abutting surface 14B reduces the transmission loss of the optical signal. A capillarity of the liquid refractive index-matching material 5 permeates the liquid refractive index-matching material 5 between the optical fiber end surfaces and the abutting surface 14B; thus, an air bubble is less likely to remain between the optical fiber end surfaces and the abutting surface 14B.

The completion of the filling of the liquid refractive index-matching material 5 completes the fiber-attached ferrule 1 of the first example of one or more embodiments.

The above-described method of manufacturing the fiber-attached ferrule 1 can reduce the deformation of the ferrule 1, thereby allowing reducing the transmission loss. Additionally, supposing that the ferrule 1 deforms, since the liquid refractive index-matching material 5 enters between the optical fiber end surfaces and the abutting surface 14B, the transmission loss can be reduced. Thus, the effect of reduction in transmission loss can be synergistically obtained.

21 Modification 1>

When the filling section 14 is filled with the liquid refractive index-matching material 5 (S106), the plurality of end surfaces of the optical fibers 3 are caused to abut onto the abutting surface 14B. Accordingly, the plurality of optical fibers 3 serve as barriers inside of the filling section 14. The liquid refractive index-matching material 5 is likely to accumulate on the upper portions of the plurality of optical fibers 3. Consequently, the liquid refractive index-matching material 5 accumulated on the upper portions of the plurality of optical fibers 3 blocks the filling section 14. This makes it difficult for the liquid refractive index-matching material 5 to reach the lower side of the filling section 14 and an air bubble is possibly formed at the bottom of the filling section 14. Thus, a ventilation hole may be formed between the bottom surface of the filling section 14 and the lower surface of the ferrule 1.

Figure 5A:
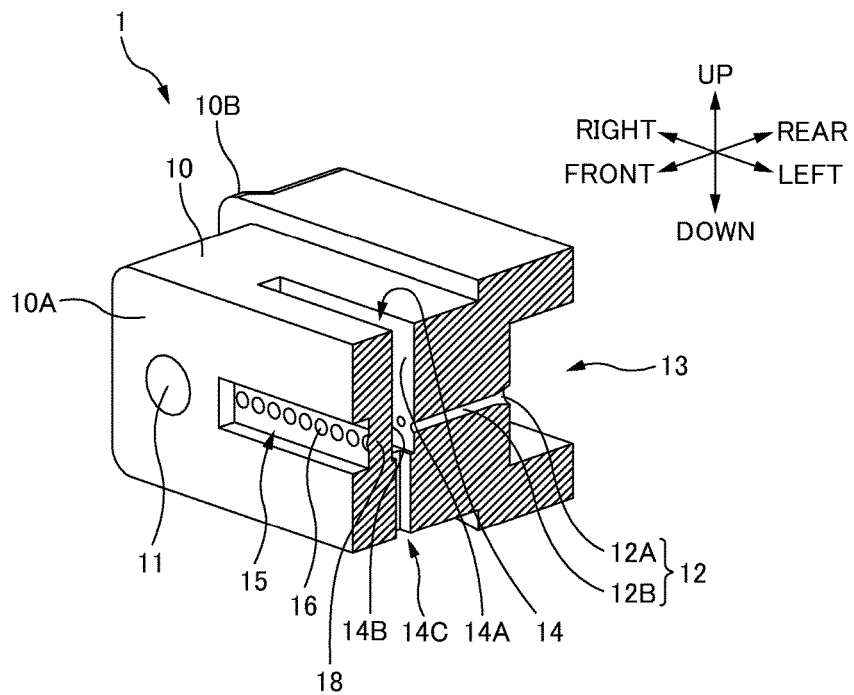
FIG. 5A is a cutaway perspective view of the ferrule 1 according to one or more embodiments.
Figure 5B:
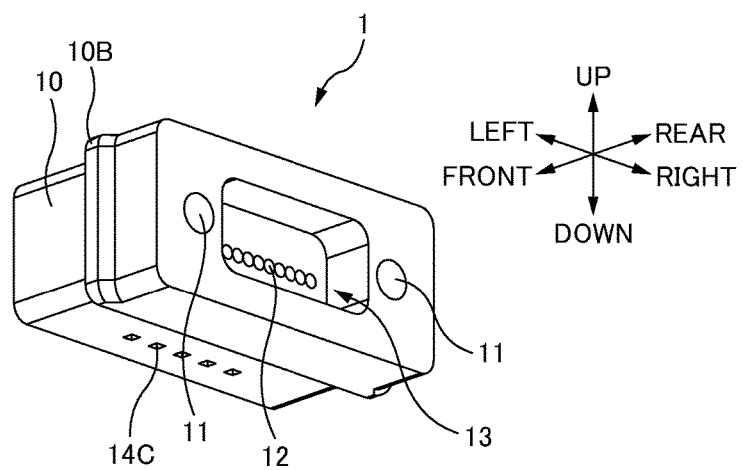
FIG. 5B is an overall perspective view of the ferrule 1 according to one or more embodiments.

FIG. 5A is a cutaway perspective view of the ferrule 1 of a modification of the first example of one or more embodiments. FIG. 5B is an overall perspective view of the ferrule 1 of the modification of the first example of one or more embodiments.

The ferrule 1 of this modification includes ventilation holes 14C to the bottom of the filling section 14. The liquid refractive index-matching material 5 needs to have a physical property with which the liquid refractive index-matching material 5 does not leak from the ventilation holes 14C. Note that, since the liquid refractive index-matching material 5 has a physical property to the extent of not causing a leakage from the filling section 14, it is only necessary to configure the openings of the ventilation holes 14C smaller than the opening on the upper side of the filling section 14. In the case where the ventilation holes 14C are disposed to the bottom surface of the filling section 14, an air bubble is less likely to be formed to the bottom of the filling section 14. Additionally, an effect that the work time taken for filling the filling section 14 with the liquid refractive index-matching material can be shortened is obtained.

In the modification illustrated in FIG. 5A and FIG. 5B, although the plurality of small ventilation holes 14C are arranged in the right-left direction, the ventilation hole 14C may be one or may be an opening elongated in the right-left direction.

<Modification 2>

The ferrule 1 may have a lid to block the opening on the upper side of the filling section 14. Closing the filling section 14 with the lid allows sealing the liquid refractive index-matching material 5 in the filling section 14. In the case of disposing the lid, since the dilution of the liquid refractive index-matching material 5 due to the condensation does not occur, this is advantageous in that this eliminates the need for the lower limit of the viscosity of the liquid refractive index-matching material 5. This lid is constituted of the resin with the coefficient of linear expansion to the extent identical to the resin constituting the ferrule 1. For example, the lid can be constituted of the resin identical to the ferrule 1. For example, the lid is a plate-shaped body with a shape identical to the opening on the upper side of the filling section 14. This lid is fitted to the opening and is bonded and fixed to the ferrule 1 with the adhesive with the coefficient of linear expansion similar to the ferrule 1.

<Optical Connector>

Figure 6:
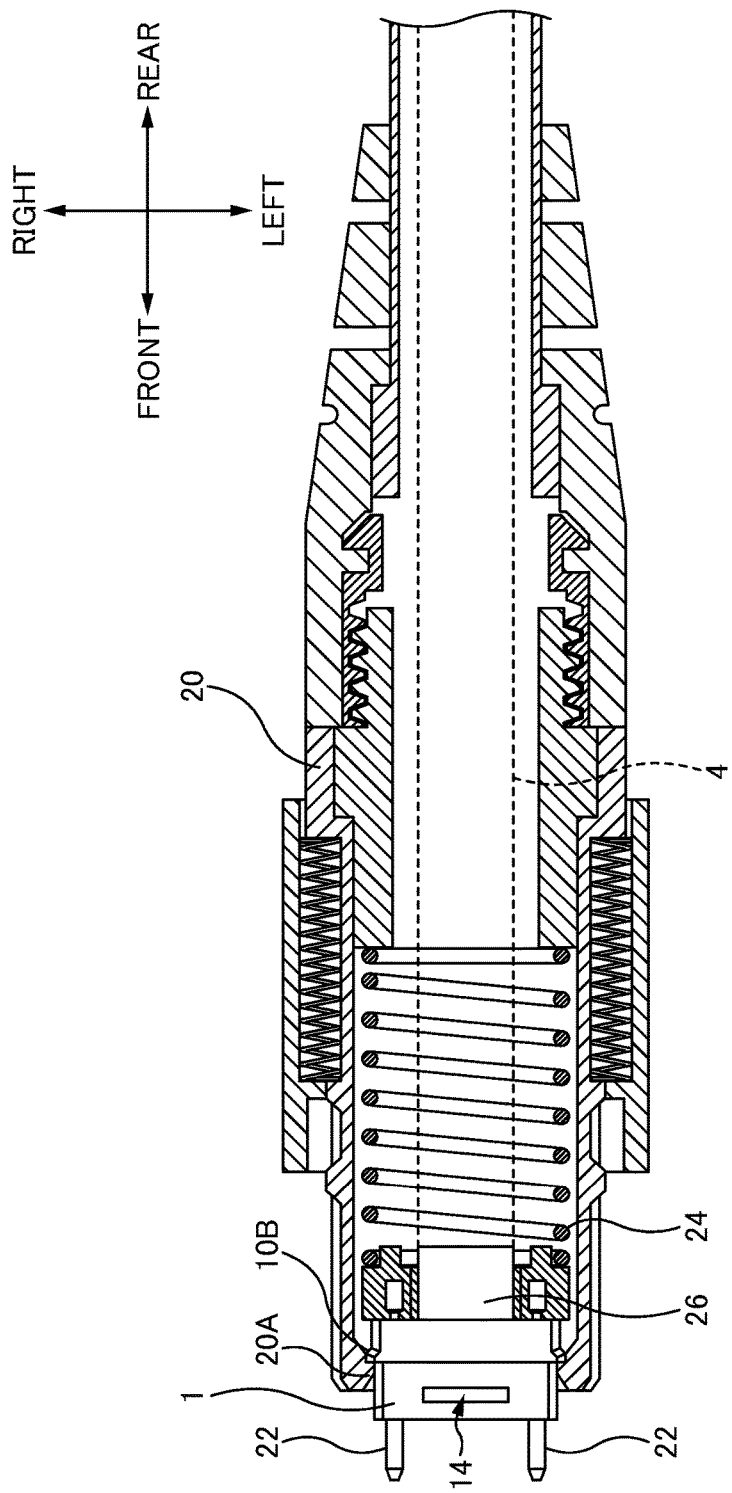
FIG. 6 is a schematic cross-sectional view of an optical connector using the ferrule 1 according to the first example of one or more embodiments.

FIG. 6 is a schematic cross-sectional view of the optical connector using the ferrule 1 of the first example of one or more embodiments. As illustrated in the drawing, the ferrule 1 can be housed in a housing 20 for the optical connector for use.

The housing 20 is a member that houses the ferrule 1 to be retreatable. A protruding part 20A is faulted in an internal space of the housing 20. With this protruding part 20A engaged with the flange part 10B of the ferrule 1, the ferrule 1 is biased to the front side by a repulsion force from a spring 24.

The guide pins 22 are inserted into the two guide pin holes 11 of the ferrule 1. These guide pins 22 position the ferrule 1 with respect to a ferrule 1 of the optical connector on the other side. The boot 26 is inserted into the boot hole 13 of the ferrule 1. The boot 26 is a member whose cross-sectional surface has an approximately tubular rectangular shape. The plurality of respective optical fibers 3 of the optical fiber ribbon 4 penetrate the boot 26 in the front-rear direction. The dimensions of the boot 26 in the right-left direction and the up-down direction are approximately identical to the dimensions of the boot hole 13. The boot 26 is fitted to the boot hole 13.

<Working Example>

Following the procedure illustrated in FIG. 4, optical-fiber-attached ferrules of the first example of one or more embodiments (see FIG. 3A) and optical-fiber-attached ferrules of the comparative example (see FIG. 3B) were manufactured. An environmental testing of changing temperatures of the optical-fiber-attached ferrules in the order of −40° C., 25° C., and 75° C. was conducted. Amounts of increase in loss of the optical fibers during the environmental testing were measured and the optical-fiber-attached ferrules were evaluated based on the amounts of increase in loss.

The maximum amounts of increase in loss among the amounts of increase in loss of the eight optical fibers of eight-core optical fiber ribbon were 1.0 dB in the comparative example, whereas it was equal to or less than 0.3 dB in the first example of one or more embodiments. The amounts of increase in loss of most of the eight optical fibers of the comparative example exceeded 0.3 dB. That is, when the optical fiber with the amount of increase in loss of equal to or more than 0.3 dB was evaluated as "poor," while the almost all optical fibers of the comparative example were evaluated as "poor, " the first example of one or more embodiments had no optical fibers evaluated as "poor."

A ferrule 1 of a second example of one or more embodiments has a reflective section 19. The optical signal is transmitted via the reflective section 19.

Figure 7:
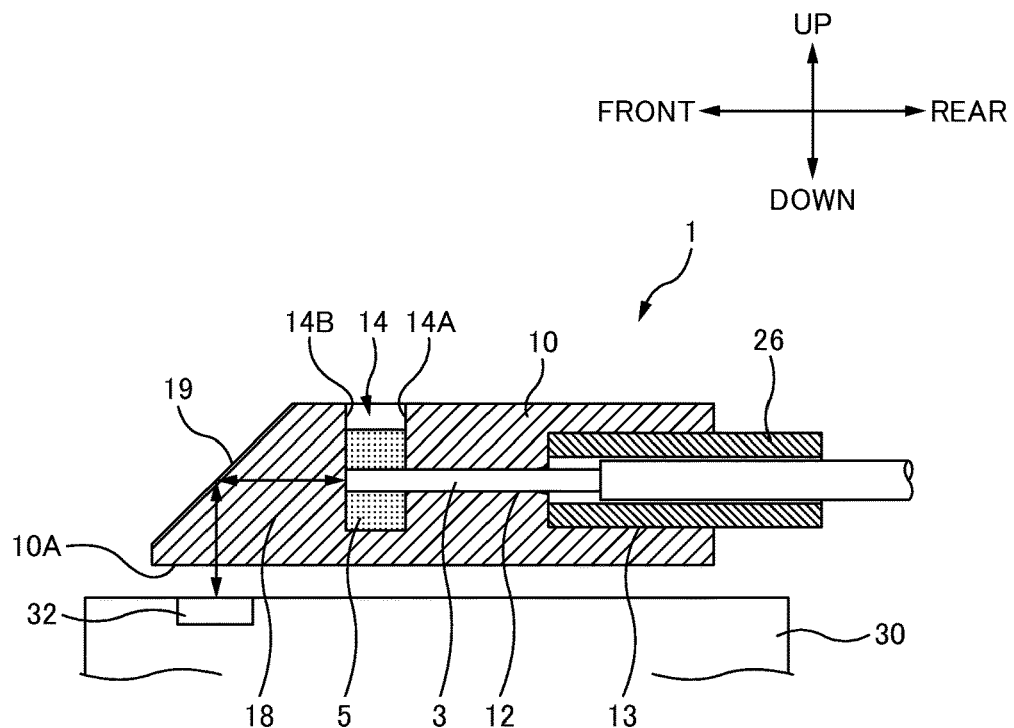
FIG. 7 is a schematic cross-sectional view of the ferrule 1 according to a second example of one or more embodiments.

FIG. 7 is a schematic cross-sectional view of the ferrule 1 of the second example of one or more embodiments. Like reference numerals designate corresponding or identical elements of the first example of one or more embodiments, and therefore description of such elements will be omitted.

The ferrule 1 of the second example of one or more embodiments is fixed on a photoelectric conversion module 30 via a holder (not illustrated). For example, a positioning pin (not illustrated) is formed on a lower surface of the ferrule 1. The positioning pin is fitted to a positioning hole (not illustrated) of the holder (not illustrated) bonded and fixed to the top surface of the photoelectric conversion module 30. Thus, the ferrule 1 is positioned with respect to the photoelectric conversion module 30. A light-emitting element such as a semiconductor laser or a light receiving element such as a photodiode is used as a light element 32 of the photoelectric conversion module 30.

A body portion 10 of the ferrule 1 of the second example of one or more embodiments is, similar to the body portion 10 of the first example of one or more embodiments, integrally molded with the resin, which transmits the optical signals. In the second example of one or more embodiments, the lower surface of the body portion 10 is the ferrule end surface 10A. The ferrule 1 includes the plurality of optical fiber holes 12, which are arranged in the right-left direction (the direction vertical to the paper) and the filling section 14. The filling section 14 has the optical fiber hole opening surface 14A and the abutting surface 14B, which is opposed to the openings of the optical fiber holes 12 (the opposed surface opposed to the optical fiber hole opening surface 14A). In the body portion 10, the site on the front side with respect to the abutting surface 14B of the filling section 14 is configured as the light transmitting part 18, and the light transmitting part 18 includes the reflective section 19. The reflective section 19 has an inclined surface inclined to the rear side as nearer it gets to the upper side.

When the light element 32 is the light-emitting element, the reflective section 19 reflects the light entering the ferrule end surface 10A to the end surfaces of the optical fibers 3 (transforms the light parallel to the up-down direction into the light parallel to the front-rear direction). When the light element 32 is the light receiving element, the reflective section 19 reflects the light emitted from the end surfaces of the optical fibers 3 to the light element 32 (transforms the light parallel to the front-rear direction into the light parallel to the up-down direction). Thus, the reflective section 19 reflects the light (the optical signal) to transform the optical path.

With the second example of one or more embodiments as well, the liquid refractive index-matching material 5 is filled in the filling section 14. The liquid refractive index-matching material 5 filled in the filling section 14 is not hardened but is held as a liquid. The second example of one or more embodiments can also reduce the defamation of the ferrule 1, thereby allowing reducing the transmission loss. Additionally, supposing that the ferrule 1 deforms, since the liquid refractive index-matching material 5 enters between the optical fiber end surfaces and the abutting surface 14B, the transmission loss can be reduced. Thus, the effect of reduction in transmission loss can be synergistically obtained.

===Others===

The above-described embodiments are intended for easy understanding of the present invention and are not in any way to be construed as limiting the present invention. Needless to say, the present invention may be modified and improved without departing from the gist of the invention, and equivalents thereof are also encompassed by the invention.

REFERENCE SIGNS LIST 1 ferrule, 3 optical fiber,
4 optical fiber ribbon, 5 refractive index-matching material,
10 body portion, 10A ferrule end surface, 10B flange part,
11 guide pin hole, 12 optical fiber hole,
12A tapered part, 12B fiber fixing part,
13 boot hole, 14 filling section,
14A optical fiber opening surface, 14B abutting surface,
14C ventilation hole,
15 recess site, 16 lens section,
18 light transmitting part, 19 reflective section,
20 housing, 20A protruding part,
22 guide pin,
24 spring, 26 boot,
30 photoelectric conversion module, 32 light element Although the disclosure has been described with respect to only a limited number of embodiments, those skilled in the art, having benefit of this disclosure, will appreciate that various other embodiment may be devised without departing from the scope of the present invention. Accordingly, the scope of the invention should be limited only by the attached claims.

The invention claimed is:

1. An optical-fiber-attached ferrule comprising:
   an optical fiber hole into which an optical fiber is inserted; and
   a filling section filled with a non-hardened filler that remains in a non-hardened state, wherein
   the filling section internally includes an opening surface of the optical fiber hole and an opposed surface that is opposed to the opening surface,
   the filling section is filled with the non-hardened filler while an end surface of the optical fiber inserted into the optical fiber hole abuts on the opposed surface, and
   the non-hardened filler has a viscosity in a range of 100 to 100000 mPa·s.

2. The optical-fiber-attached ferrule according to claim 1, wherein the non-hardened filler has water repellency.

3. The optical-fiber-attached ferrule according to claim 1, wherein the non-hardened filler does not overflow from the filling section when an opening of the filling section is provided downward.

4. The optical-fiber-attached ferrule according to claim 1, wherein:
   the optical fiber is inserted into and fixed with a boot, and
   the boot is fixed with a boot hole disposed to the ferrule.

5. The optical-fiber-attached ferrule according to claim 1, wherein the optical fiber hole is fixed with the optical fiber.

6. The optical-fiber-attached ferrule according to claim 1, comprising:
   a recess site recessed with respect to an end surface of the ferrule; and
   a lens section formed to the recess site, wherein the lens section is disposed to correspond with the optical fiber hole.

7. The optical-fiber-attached ferrule according to claim 1, wherein a ventilation hole is formed in a bottom of the filling section.

8. The optical-fiber-attached ferrule according to claim 1, comprising a lid that blocks the opening of the filling section.

9. A method of manufacturing an optical-fiber-attached ferrule, comprising:
   preparing a ferrule that includes:
      an optical fiber hole into which an optical fiber is inserted, and
      a filling section filled with a non-hardened filler that remains in a non-hardened state, wherein the filling section internally includes an opening surface of the optical fiber hole and an opposed surface that is opposed to the opening surface;

causing an end surface of the optical fiber that protrudes from the opening surface to abut onto the opposed surface by inserting the optical fiber into the optical fiber hole; and filling the filling section with the non-hardened filler while the end surface of the optical fiber abuts on the opposed surface, wherein the non-hardened filler has a viscosity in a range of 100 to 100000 mPa·s.

* * * * *